US012158259B2

(12) United States Patent
He

(10) Patent No.: US 12,158,259 B2
(45) Date of Patent: Dec. 3, 2024

(54) LED STRIP LIGHT AND EXPANSION STRUCTURE THEREOF

(71) Applicant: Chongyi Jingyi Lighting Product Co., Ltd, Jiangxi (CN)

(72) Inventor: Yaoquan He, Jiangxi (CN)

(73) Assignee: Chongyi Jingyi Lighting Product Co., Ltd, Ganzhou (CN)

( * ) Notice: Subject to any disclaimer, the term of this patent is extended or adjusted under 35 U.S.C. 154(b) by 217 days.

(21) Appl. No.: 17/881,325

(22) Filed: Aug. 4, 2022

(65) Prior Publication Data

US 2023/0042162 A1 Feb. 9, 2023

(30) Foreign Application Priority Data

Aug. 4, 2021 (CN) ......................... 202110894189.3
Sep. 18, 2021 (CN) ......................... 202111104659.8

(51) Int. Cl.

*F21V 23/00* (2015.01)
*F21V 19/00* (2006.01)
*F21Y 103/10* (2016.01)
*F21Y 115/10* (2016.01)

(52) U.S. Cl.

CPC ........ *F21V 23/001* (2013.01); *F21V 19/0025* (2013.01); *F21Y 2103/10* (2016.08); *F21Y 2115/10* (2016.08)

(58) Field of Classification Search

CPC .......................... F21V 19/0025; F21V 23/001
See application file for complete search history.

(56) References Cited

U.S. PATENT DOCUMENTS

2008/0179604 A1* 7/2008 Wang .................. H01L 25/0753 257/E25.02
2012/0326634 A1* 12/2012 Li .......................... H05B 47/18 315/312

* cited by examiner

*Primary Examiner* — John W Poos
*Assistant Examiner* — Nathaniel J Lee

(57) ABSTRACT

An LED strip light, including: a first signal line, a second power supply wire and a third power supply wire along a first direction as well as a first LED luminous body and a second LED luminous body along a second direction, and the first LED luminous body being electrically connected to the second LED luminous body; a first type of pins of the first LED luminous body and a first type of pins of the second LED luminous body are in a roughly aligned spatial location relationship along the second direction; and moreover, the strip light has any one of the following characteristics: when the first LED luminous body and the second LED luminous body are connected in series, different types of power supply pins are arranged on a same straight line in a staggered manner.

9 Claims, 6 Drawing Sheets

LED STRIP LIGHT AND EXPANSION STRUCTURE THEREOF

CROSS-REFERENCE TO RELATED APPLICATIONS

This application claims priorities from Chinese Patent Application Nos. 2021108941893, filed Aug. 4, 2021, and from 2021111046598 filed Sep. 18, 2021, the content of which are incorporated herein in the entirety by reference.

TECHNICAL FIELD

The present disclosure relates to the technical field of led light structures, in particular to an LED strip light and an expansion structure thereof.

BACKGROUND

An LED, namely a light emitting diode, is a light emitting device that converts electric energy into light energy, and has been widely used for lighting urban landscapes due to its advantages of energy saving, long service life, various light colors, and the like.

The voltage of an existing cascaded point-controlled LED light is mostly 5V-12V and mostly in a full parallel connection structure. However, at the current voltage of 5V-12V, if the number of carried luminous bodies is large, the voltage drop caused by wires and the luminous bodies is large, and in addition, the current required by the parallel connection structure is larger, so that the wires are thicker, a power supply is larger, and the cost is increased.

If the parallel connection structure is changed into a series connection structure, although a high-voltage light can be formed, LED chips or LED luminous bodies are arranged at intervals, and in a process of manufacturing the LED light, the arrangement errors of positive pins and negative pins are easily caused, so that the manufacturing efficiency is low or faults occur in the testing/using process.

SUMMARY

On that account, the present disclosure provides an LED strip light, including:

a first signal line, a second power supply wire and a third power supply wire along a first direction as well as a first LED luminous body and a second LED luminous body along a second direction, and the first LED luminous body being electrically connected to the second LED luminous body;

the first LED luminous body further including a first type of pins and a second type of pins arranged along the first direction as well as a third type of pins;

the first type of pins, the second type of pins and the third type of pins being respectively used for being connected to the first signal line, the second power supply wire and the third power supply wire;

the first type of pins of the first LED luminous body and the first type of pins of the second LED luminous body being in a roughly aligned spatial location relationship along the second direction;

moreover, the strip light having any one of the following characteristics:

(1) along the first LED luminous body and the second direction, the strip light further includes a second LED luminous body, and when the first LED luminous body and the second LED luminous body are connected in series, the second type of pins of the first LED luminous body and the third type of pins of the second LED luminous body are in a roughly aligned spatial location relationship along the second direction; and the third type of pins of the first LED luminous body and the second type of pins of the second LED luminous body are in a roughly aligned spatial location relationship along the second direction;

(2) along the first LED luminous body and the second direction, the strip light further includes a second LED luminous body, and when the first LED luminous body and the second LED luminous body are connected in parallel, the second type of pins of the first LED luminous body and the second type of pins of the second LED luminous body are in a roughly aligned spatial location relationship along the second direction; and the third type of pins of the first LED luminous body and the third type of pins of the second LED luminous body are in a roughly aligned spatial location relationship along the second direction.

Preferably, the first LED luminous body includes a rack body as well as a first substrate, a second substrate and a third substrate which are connected to the rack body and are spaced from one another; and the first type of pins, the second type of pins and the third type of pins respectively extend out of the periphery of the rack body from the first substrate, the second substrate and the third substrate.

Preferably, a plane in the extending-out direction of the first type of pins is perpendicular to a plane in the extending-out direction of the second or third type of pins.

Preferably, the LED strip light has the ability of expanding other LED luminous bodies with the structures the same as the structure of the first LED luminous body in a cascading manner, and the third direction is parallel to the second direction.

Preferably, the first LED luminous body includes a built-in driving IC and LED chips used as pixel points to emit light, so that the strip light is a point-controlled LED light.

Preferably, the rack body of the LED luminous body is square, and includes a first plate-shaped edge, a second plate-shaped edge, a third plate-shaped edge and a fourth plate-shaped edge which are connected end to end;

an end of the first substrate extends out of the rack body from a direction perpendicular to the first plate-shaped edge;

two ends of the second substrate respectively extend out of the rack body from two opposite directions perpendicular to the second plate-shaped edge and the fourth plate-shaped edge; and an end of the third substrate extends out of the rack body from a direction perpendicular to the third plate-shaped edge.

Preferably, the first type of pins include a first connecting portion and a second connecting portion which extend out from the first substrate and are spaced from each other, and a space is formed between the first connecting portion and the second connecting portion and used as a trimming opening.

The second connecting portion of the first LED luminous body and the first connecting portion of the second luminous body are electrically connected.

Preferably, the first connecting portion and the second connecting portion are distributed along the second direction, wherein the first connecting portion is located at one end which is relatively close to the first signal line in the second direction, and the second connecting portion is located at the other end which is relatively away from the first signal line in the second direction.

Preferably, along the first LED luminous body and the second direction, the strip light further includes a second LED luminous body, and when the first LED luminous body and the second LED luminous body are connected in series:

the first LED luminous body and the second LED luminous body form a first LED luminous body pair, and the strip light totally includes k LED luminous body pairs, the value range of k is 1 to n, and n is a positive integer;

wherein with regard to the kth LED luminous body pair and the (k+1)th LED luminous body pair, the third type of pins of the second LED luminous body in the kth LED luminous body pair and the third type of pins of the first LED luminous body in the kth LED luminous body pair are electrically connected; and the second type of pins of the second LED luminous body in the kth LED luminous body pair and the second type of pins of the first LED luminous body in the (k+1)th LED luminous body pair are electrically connected.

Preferably, when other LED luminous bodies are expanded in a cascading manner along the third direction in the LED strip light, the other LED luminous bodies and the whole first LED luminous body along the second direction may be in a parallel connection relationship, and may also be in a series connection relationship.

To sum up, during series connection or parallel connection, the efficiency of production is improved, high voltage resistance of an LED product is improved while faults are reduced, and the production cost of a high-voltage LED product is reduced.

BRIEF DESCRIPTION OF THE DRAWINGS

In order to more clearly illustrate the technical solutions of the embodiments of the present disclosure, the drawings required in the embodiments will be briefly described below, it should be understood that the following drawings only illustrate some embodiments of the present disclosure and therefore should not be considered as limiting the scope, and those skilled in the art can also obtain other related drawings based on the drawings without inventive efforts.

REFERENCE SIGNS

Figure 1:
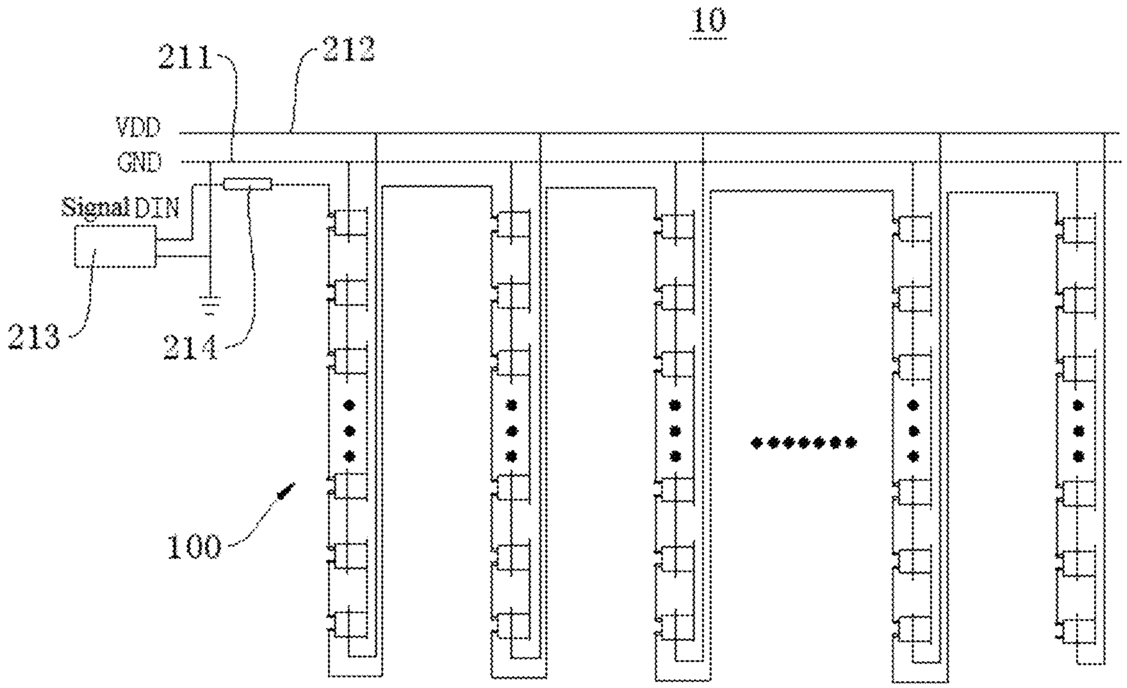
FIG. 1 is a structural diagram of a curtain structure according to an embodiment of the present disclosure.

10-curtain structure; 100-high-voltage point-controlled cascaded LED strip light; 110-luminous body; 111-first luminous body; 112-second luminous body; 113-rack body; 114-first edge; 115-second edge; 116-third edge; 117-fourth edge; 118-first substrate; 119-second substrate; 121-third substrate; 122-first weld leg portion; 123-second weld leg portion; 124-trimming opening; 125-positive electrode pin; 126-negative electrode pin; 131-first electric wire; 132-second electric wire; 133-signal line; 211-grounding main line; 212-power supply main line; 213-controller; and 214-resistor.

It should be noted that the above drawings do not limit the size ratio between a wire and each of a luminous body, a chip, and the like, and the drawings are mostly used for illustrating structures as well as a connection relationship, a spatial location relationship and the like.

DETAILED DESCRIPTION OF THE EMBODIMENTS

In order to make the objects, technical solutions and advantages of the embodiments of the present disclosure clearer, the technical solutions of the embodiments of the present disclosure will be described clearly and completely with reference to FIG. 1 to FIG. 7B of the drawings in the embodiments of the present disclosure, and obviously, the embodiments described are only a few embodiments of the present disclosure, and not all embodiments. The components of the embodiments of the present disclosure generally described and illustrated in the figures herein may be arranged and designed in a wide variety of different configurations.

Thus, the following detailed description of the embodiments of the present disclosure, as presented in the figures, is not intended to limit the scope of the present disclosure, as claimed, but is merely representative of selected embodiments of the present disclosure. All other embodiments, which can be obtained by a person skilled in the art without creative efforts based on the embodiments of the present disclosure, are within the scope of protection of the present disclosure.

It should be noted that: like reference signs and letters refer to like items in the following figures, and thus, once an item is defined in one figure, it need not be further defined or explained in subsequent figures.

In the description of the present disclosure, it should be noted that, if the terms "upper", "lower", "inner", "outer", "parallel", "vertical" and the like indicate orientations or positional relationships based on orientations or positional relationships shown in the drawings or orientations or positional relationships that are usually placed when the product of the present disclosure is used, it is only for the convenience of describing the disclosure and simplifying the description, and does not indicate or imply that the device or element referred to must have a specific orientation, be constructed and operate in a specific orientation, and thus, it should not be construed as limiting the present disclosure.

Furthermore, when the terms "first", "second", etc. appear, they are only used to distinguish one description from another and are not to be construed as indicating or implying relative importance.

It should be noted that the features of the embodiments of the present disclosure may be combined with each other without conflict.

In an embodiment, the present disclosure provides an LED strip light, including:

a first signal line, a second power supply wire and a third power supply wire along a first direction as well as a first LED luminous body and a second LED luminous body along a second direction, and the first LED luminous body being electrically connected to the second LED luminous body;

the first LED luminous body further includes a first type of pins and a second type of pins arranged along the first direction as well as a third type of pins;

the first type of pins, the second type of pins and the third type of pins are respectively used for being connected to the first signal line, the second power supply wire and the third power supply wire;

the first type of pins of the first LED luminous body and the first type of pins of the second LED luminous body are in a roughly aligned spatial location relationship along the second direction;

moreover, the strip light has any one of the following characteristics that:

(1) along the first LED luminous body and the second direction, the strip light further includes a second LED luminous body, and when the first LED luminous body and the second LED luminous body are connected in series, the second type of pins of the first LED luminous body and the third type of pins of the second LED luminous body are in a roughly aligned spatial location relationship along the second direction; and the third type of pins of the first LED luminous body and the second type of pins of the second LED luminous body are in a roughly aligned spatial location relationship along the second direction;

(2) along the first LED luminous body and the second direction, the strip light further includes a second LED luminous body, and when the first LED luminous body and the second LED luminous body are connected in parallel, the second type of pins of the first LED luminous body and the second type of pins of the second LED luminous body are in a roughly aligned spatial location relationship along the second direction; and the third type of pins of the first LED luminous body and the third type of pins of the second LED luminous body are in a roughly aligned spatial location relationship along the second direction.

With regard to the embodiment mentioned above, when in a series connection relationship, since signal lines are always in a roughly aligned spatial location relationship, it is easy to connect the signal lines to acquire data signals of LEDs to correctly display visual contents no matter how many LED luminous bodies extend along the second direction. When the first LED luminous body and the second LED luminous body are selected to be in a series connection relationship, the second type of pins and the third type of pins which are in a roughly aligned spatial location relationship are successively connected in series along almost the same straight line to form a correct series connection relationship while being arranged in a staggered manner; and similarly, in the above solution, parallel connection also can be considered, and thus, the same type of pins are successively connected in parallel along almost the same straight line to form a correct parallel connection relationship.

Specifically, for example, when positive and negative electrodes supply power, the positions of positive electrode pins and negative electrode pins of two adjacent LED luminous bodies are opposite, so that when the luminous bodies are connected in series, normal surface mounting is facilitated, and series connection of the luminous bodies with signal inputs and outputs is facilitated.

It can be appreciated that the second direction being perpendicular to the first direction is only a preferred case, which is advantageous for the strip light to extend in a direction perpendicular to the first direction. However, if the second direction is parallel to the first direction, the extending direction of the strip light may be parallel to the first direction as long as the strip light can still be connected to the relevant signal line and the power supply wire. Further, in connection with the following cascade/expansion embodiments, it can be understood that the second direction is perpendicular to or parallel to the first direction, and only when the cascade/expansion is changed, the strip lights are still parallel to each other, and the difference only lies in that: the strip lights are parallel to one another along a direction parallel to the first direction, or the strip lights are parallel to one another along a direction perpendicular to the first direction. Thus, in an expansion manner, the second direction may be at any angle to the first direction, the second direction and the first direction are not limited to be perpendicular to each other at a corresponding angle of 90 degrees or be parallel to each other at a corresponding angle of 0 degree.

In another embodiment, the first LED luminous body includes a rack body as well as a first substrate, a second substrate and a third substrate which are connected to the rack body and are spaced from one another; and the first type of pins, the second type of pins and the third type of pins respectively extend out of the periphery of the rack body from the first substrate, the second substrate and the third substrate.

In another embodiment, a plane in the extending-out direction of the first type of pins and a plane in the extending-out direction of the second or third type of pins are parallel, or are the same.

In another embodiment, the LED strip light has the ability of expanding other LED luminous bodies with the structures the same as the structure of the first LED luminous body in a cascading manner, wherein the third direction is parallel to the second direction.

In another embodiment, the first LED luminous body includes a built-in driving IC and LED chips used as pixel points to emit light, so that the strip light is a point-controlled LED light.

In another embodiment, the rack body of the LED luminous body is square and includes a first plate-shaped edge, a second plate-shaped edge, a third plate-shaped edge and a fourth plate-shaped edge which are connected end to end;

an end of the first substrate extends out of the rack body from a direction perpendicular to the first plate-shaped edge;

two ends of the second substrate respectively extend out of the rack body from two opposite directions perpendicular to the second plate-shaped edge and the fourth plate-shaped edge; and an end of the third substrate extends out of the rack body from a direction perpendicular to the third plate-shaped edge.

Further, in another embodiment, the rack body of the LED luminous body is in an irregular shape, and any one of the first substrate, the second substrate and the third substrate can further be formed from the periphery of the rack body.

That is, any one of the first substrate, the second substrate and the third substrate may be integrated with the rack body, a certain region is used for forming the first, second or third type of pins, and other certain regions are more embodied as the rack body.

In another embodiment, the first type of pins include a first connecting portion and a second connecting portion which extend out from the first substrate and are spaced from each other, and a space is formed between the first connecting portion and the second connecting portion and used as a trimming opening.

The second connecting portion of the first LED luminous body and the first connecting portion of the second luminous body are electrically connected.

In another embodiment, the first connecting portion and the second connecting portion are distributed along the second direction, wherein the first connecting portion is located at one end which is relatively close to the first signal line in the second direction, and the second connecting portion is located at the other end which is relatively away from the first signal line in the second direction.

In another embodiment, along the first LED luminous body and the second direction, the strip light further includes a second LED luminous body, and when the first LED luminous body and the second LED luminous body are connected in series:

the first LED luminous body and the second LED luminous body form a first LED luminous body pair, the strip light totally includes k LED luminous body pairs, the value range of k is 1 to n, and n is a positive integer;

wherein with regard to the kth LED luminous body pair and the (k+1)th LED luminous body pair, the third type of pins of the second LED luminous body in the kth LED luminous body pair and the third type of pins of the first LED luminous body in the kth LED luminous body pair are electrically connected; and the second type of pins of the second LED luminous body in the kth LED luminous body pair and the second type of pins of the first LED luminous body in the (k+1)th LED luminous body pair are electrically connected.

In another embodiment, when other LED luminous bodies are expanded in a cascaded manner along the third direction in the LED strip light, the other LED luminous bodies and the whole first LED luminous body along the second direction may be in a parallel connection relationship, and may also be in a series connection relationship.

In another embodiment, an embodiment of the present disclosure provides a high-voltage point-controlled cascaded LED strip light, including a plurality of luminous bodies, and the plurality of luminous bodies are connected to one another in series; and the luminous bodies are provided with positive electrode pins and negative electrode pins, and the positions of the positive electrode pins and the negative electrode pins of the two adjacent luminous bodies are opposite.

Optionally, the high-voltage point-controlled cascaded LED strip light further includes a signal line, the luminous body is provided with a rack body and a first substrate connected to the rack body, an end of the first substrate extends out of the rack body to form a weld leg, and the weld leg is electrically connected to the signal line.

Optionally, the weld leg includes a first weld leg portion and a second weld leg portion, the first weld leg portion and the second weld leg portion extend out of the rack body, and the first weld leg portion and the second weld leg portion are spaced from each other so that a trimming opening is formed between the first weld leg portion and the second weld leg portion.

Optionally, the luminous body further includes a second substrate and a third substrate, and the second substrate and the third substrate are both connected to the rack body; and an end of the second substrate extends out of the rack body to form a positive electrode pin, and an end of the third substrate extends out of the rack body to form a negative electrode pin; or an end of the second substrate extends out of the rack body to form the negative electrode pin, and an end of the third substrate extends out of the rack body to form the positive electrode pin.

Optionally, the first substrate, the second substrate and the third substrate are successively distributed at intervals.

Optionally, the rack body is square, the rack body is provided with a first edge, a second edge, a third edge and a fourth edge which are connected end to end, an end of the first substrate extends out of the rack body from the first edge, two ends of the second substrate respectively extend out of the rack body from the second edge and the fourth edge, and an end of the third substrate extends out of the rack body from the third edge.

An embodiment of the present disclosure further provides a curtain structure, including the plurality of high-voltage point-controlled cascaded LED strip lights, and the plurality of high-voltage point-controlled cascaded LED strip lights are connected to one another.

Optionally, the curtain structure further includes a grounding main line and a power supply main line, one ends of the plurality of high-voltage point-controlled cascaded LED strip lights are electrically connected to the grounding main line, and the other ends of the plurality of high-voltage point-controlled cascaded LED strip lights are electrically connected to the power supply main line, so that the plurality of high-voltage point-controlled cascaded LED strip lights are connected to one another in parallel.

Optionally, the plurality of high-voltage point-controlled cascaded LED strip lights are connected to one another in series.

Optionally, the signal lines of the plurality of high-voltage point-controlled cascaded LED strip lights are successively connected, the curtain structure further includes a controller, and the signal lines are electrically connected to the controller.

The high-voltage point-controlled cascaded LED strip light and the curtain structure according to the embodiment of the present disclosure have the following beneficial effects:

the high-voltage point-controlled cascaded LED strip light provided by an embodiment of the present disclosure includes a plurality of luminous bodies, the plurality of luminous bodies are connected to each other in series, and then the technical problem that an existing parallel connection type cascaded point-controlled LED light is high in current and high in cost can be effectively solved. The luminous bodies are provided with positive electrode pins and negative electrode pins, meanwhile, positions of the positive electrode pins and the negative electrode pins of the two adjacent luminous bodies are opposite, therefore, when connected in series, the plurality of luminous bodies may be subjected to normal surface mounting, and series connection of the luminous bodies with signal inputs and outputs is facilitated.

An embodiment of the present disclosure further provides a curtain structure, the curtain structure includes the plurality of high-voltage point-controlled cascaded LED strip lights, and the plurality of high-voltage point-controlled cascaded LED strip lights are connected to each other to form the curtain structure. Because the curtain structure includes the high-voltage point-controlled cascaded LED strip lights, the curtain structure also has the beneficial effects of low current, low cost, and a large number of carried lights.

Figure 2:
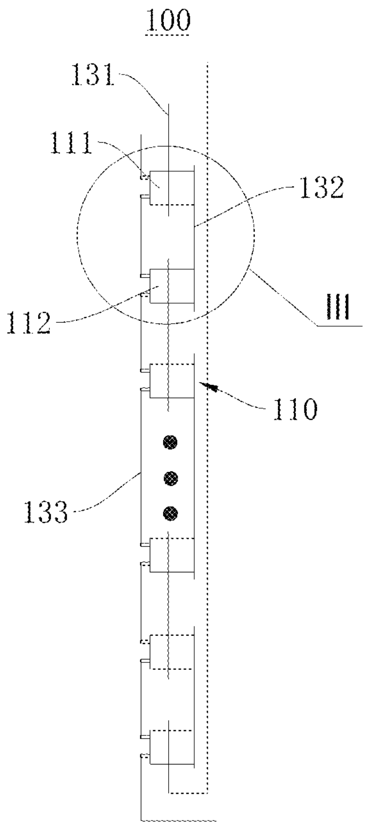
FIG. 2 is a structural diagram of a high-voltage point-controlled cascaded LED strip light according to an embodiment of the present disclosure.
Figure 3:
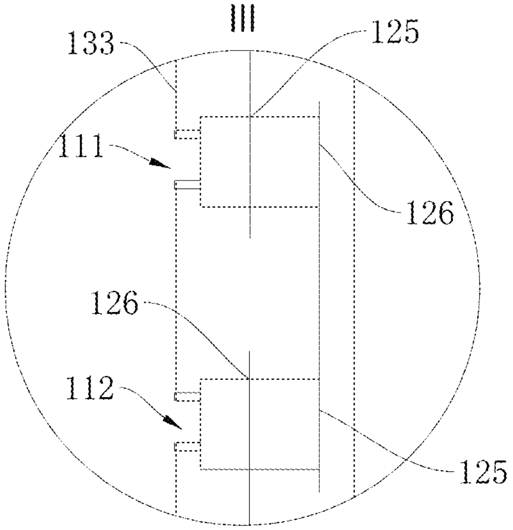
FIG. 3 is an enlarged schematic view of a partial structure at III in FIG. 2.

FIG. 1 is a structural diagram of a curtain structure 10 provided by the embodiment, FIG. 2 is a structural diagram of a high-voltage point-controlled cascaded LED strip light provided by the embodiment, and FIG. 3 is an enlarged schematic view of a partial structure at III in FIG. 2. Referring to FIG. 1 to FIG. 3, the embodiment provides a high-voltage point-controlled cascaded LED strip light 100, and correspondingly, provided is a curtain structure 10.

The curtain structure 10 includes a plurality of high-voltage point-controlled cascaded LED strip lights 100, and the plurality of high-voltage point-controlled cascaded LED strip lights 100 are connected to one another to form the curtain structure 10 in the shape of a curtain.

The high-voltage point-controlled cascaded LED strip light 100 includes a plurality of luminous bodies 110, the plurality of luminous bodies 110 are connected to one another in series, and thus, the technical problem that an existing parallel connection type cascaded point-controlled LED light is high in current and high in cost can be effectively solved. The luminous body 110 is provided with a positive electrode pin 125 and a negative electrode pin 126, meanwhile, the positions of the positive electrode pins 125 and the negative electrode pins 126 of the two adjacent luminous bodies 110 are opposite, thus, when connected in series, the plurality of luminous bodies 110 may be subjected to normal surface mounting, and series connection of the luminous bodies 110 with signal inputs and outputs is facilitated.

When common LED luminous bodies 110 are connected in series on two wires, different groups of LEDs need to be placed at an angle of 180 degrees (namely, a first group of LEDs are subjected to normal surface mounting, a second group of LEDs are subjected to surface mounting at an angle of 180 degrees, and a third group of LEDs are also subjected to normal surface mounting), the production difficulty is high, moreover, if the luminous bodies 110 with signal inputs and outputs are subjected to surface mounting at an angle of 180 degrees, the positions of signal inputs and outputs are opposite, and then abnormality of the strip light is caused. In the high-voltage point-controlled cascaded LED strip light 100, positions of the positive electrode pins 125 and the negative electrode pins 126 of the two adjacent luminous bodies 110 are opposite, therefore, when connected in series, the plurality of luminous bodies 110 may be subjected to normal surface mounting, and series connection of the luminous bodies 110 with signal inputs and outputs is facilitated.

It should be noted that, the positions of the positive electrode pins 125 and the negative electrode pins 126 of the two adjacent luminous bodies 110 are opposite, namely, in the two adjacent luminous bodies 110, the negative electrode pin 126 of the other luminous body 110 is arranged at the position of the positive electrode pin 125 in one luminous body 110, the positive electrode pin 125 of the other luminous body 110 is arranged at the position of the negative electrode pin 126 of one luminous body 110, in other words, the luminous bodies 110 in the high-voltage point-controlled cascaded LED strip light 100 have two structures, the luminous bodies 110 of the two structures are a first luminous body 111 and a second luminous body 112 respectively, the structure of the first luminous body 111 is roughly the same as that of the second luminous body 112, and the difference lies in that the positive and negative electrode pins 126 of the two luminous bodies 110 are reversed in position (as shown in FIG. 3).

Figure 4:
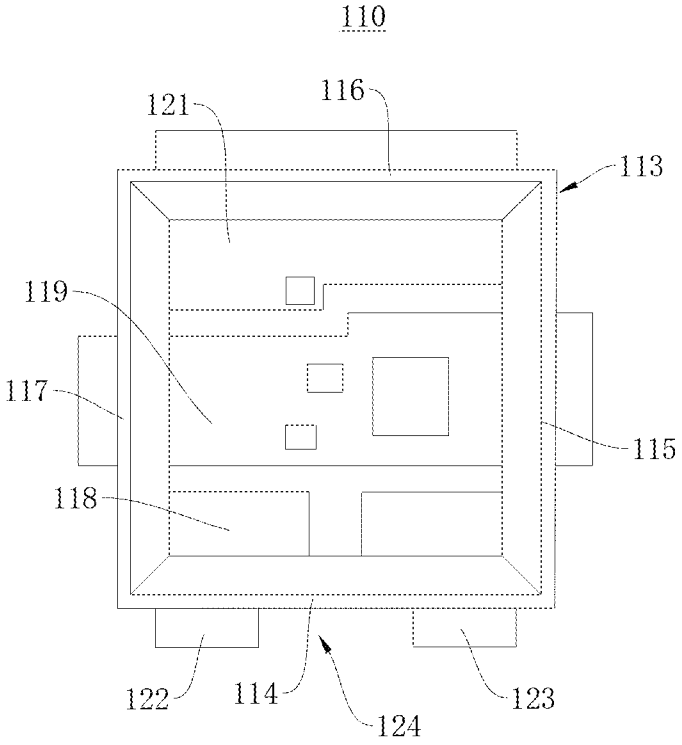
FIG. 4 is a structural diagram of a high-voltage point-controlled cascaded LED strip light according to an embodiment of the present disclosure.

The structure of the high-voltage point-controlled cascaded LED strip light 100 provided in the embodiment is further described below:

FIG. 4 is a structural diagram of the high-voltage point-controlled cascaded LED strip light 100 provided by the embodiment. Referring to FIG. 2 to FIG. 4, in the embodiment, the high-voltage point-controlled cascaded LED strip light 100 further includes a signal line 133. The luminous body 110 is provided with a rack body 113 and a first substrate 118 connected to the rack body 113, an end of the first substrate 118 extends out of the rack body 113 to form a weld leg, and the weld leg is electrically connected to the signal line 133, so that input and output of signals are realized.

Further, the luminous body 110 further includes a second substrate 119 and a third substrate 121, and the second substrate 119 and the third substrate 121 are both connected to the rack body 113. An end of the second substrate 119 and an end of the third substrate 121 extend out of the rack body 113 to form positive and negative electrode pins 125, 126 of the luminous body 110. Specifically, in the first luminous body 111, an end of the second substrate 119 extends out of the rack body 113 to form a positive electrode pin 125, and an end of the third substrate 121 extends out of the rack body 113 to form a negative electrode pin 126; and in the second luminous body 112, an end of the second substrate 119 extends out of the rack body 113 to form a negative electrode pin 126, and an end of the third substrate 121 extends out of the rack body 113 to form a positive electrode pin 125.

Specifically, the rack body 113 is square, and the rack body 113 is provided with a first edge 114, a second edge 115, a third edge 116 and a fourth edge 117 which are connected end to end. An end of the first substrate 118 extends out of the rack body 113 from the first edge 114, two ends of the second substrate extend out of the rack body 113 from the second edge 115 and the fourth edge 117 respectively, and an end of the third substrate 121 extends out of the rack body 113 from the third edge 116.

Further, the first substrate 118, the second substrate 119 and the third substrate 121 are spaced from one another, a luminous chip of the luminous body 110 is arranged on the second substrate 119, and thus, exchange of a positive electrode and a negative electrode in the luminous body 110 is facilitated to form the two luminous bodies 110 including the first luminous body 111 and the second luminous body 112 which have the opposite positions of the positive electrodes and the negative electrodes.

With reference to FIG. 2 to FIG. 4, in the embodiment, the number of the first luminous bodies 111 and the number of the second luminous bodies 112 are multiple, and the multiple first luminous bodies 111 and the multiple second luminous bodies 112 are alternately arranged, that is, in the same high-voltage point-controlled cascaded LED strip light 100, the first luminous body 111, the second luminous body 112, the first luminous body 111, the second luminous body 112 . . . and so on are arranged in sequence along the arrangement direction of the luminous body 110. The positive electrode pin 125 of the luminous body 110 is connected to the positive electrode pin 125 of the former luminous body 110 by means of a positive electrode line segment, the negative electrode pin 126 of the luminous body 110 is connected to the negative electrode pin 126 of the latter luminous body 110 by means of a negative electrode line segment, and thus, the plurality of luminous bodies 110 are connected together in series. Specifically, the three adjacent luminous bodies 110 form a unit of the luminous bodies 110, for example, the luminous body 110 in the middle is taken as a first luminous body 111, the luminous bodies 110 on two sides are taken as second luminous bodies 112, in the unit of the luminous bodies 110, the positive electrode pin 125 of the first luminous body 111 is connected to the positive electrode pin 125 of the second luminous body 112 on one side, the negative electrode pin 126 of the first luminous body 111 is connected to the negative electrode pin 126 of the second luminous body 112 on the other side, and thus, the three luminous bodies 110 in the unit of the luminous bodies 110 are connected in series.

Specifically, the high-voltage point-controlled cascaded LED strip light 100 further includes a first electric wire 131 and a second electric wire 132, the first electric wire 131 and the second electric wire 132 extend along the arrangement direction of the luminous bodies 110, the second substrates 119 of the luminous bodies 110 are electrically connected to the first electric wire 131, and the third substrates 121 of the luminous bodies 110 are electrically connected to the second electric wire 132. After connection, a structure shown in FIG. 2 is taken as an example, the luminous body 110 on the top of the high-voltage point-controlled cascaded LED strip light 100 is a first luminous body 111, from top to bottom, the second luminous body 110 is a second luminous body 112, the first electric wire 131 between the first luminous body 110 and the second luminous body 110 is disconnected, the second electric wire 132 between the second luminous body 110 and the third luminous body 110 is disconnected, thus, the part, which is connected to the first luminous body 110 and the second luminous body 110, of the second electric wire 132 becomes a negative electrode line segment, the first electric wire 131 between the third luminous body 110 and the fourth luminous body 110 is shorn off, and thus, the part, which is connected to the second luminous body 110 and the third luminous body 110, of the first electric wire 131 becomes a negative electrode line segment.

Besides, in order to guarantee normal operation of the luminous bodies 110, signal outputs and signal inputs cannot communicate with each other directly, and thus, the signal lines 133 need to be shorn off. In order to facilitate line shearing, the weld leg formed by the first substrate 118 includes a first weld leg portion 122 and a second weld leg portion 123, the first weld leg portion 122 and the second weld leg portion 123 respectively extend out of the rack body 113, the first weld leg portion 122 and the second weld leg portion 123 are spaced from each other, and thus, a trimming opening 124 is formed between the first weld leg portion 122 and the second weld leg portion 123. Specifically, during production, different parts of the complete signal line 133 are separately welded to the first weld leg portion 122 and the second weld leg portion 123, then the portion, between the first weld leg portion 122 and the second weld leg portion 123, of the signal line 133 is shorn off, thus, the signal line 133 is connected to one of the first weld leg portion 122 and the second weld leg portion 123 for signal input, and the signal line 133 is connected to the other one of the first weld leg portion 122 and the second weld leg portion 123 for signal output.

The high-voltage point-controlled cascaded LED strip light 100 provided by the embodiment at least has the following advantages that:

- in the high-voltage point-controlled cascaded LED strip light 100 provided by the embodiment, the luminous bodies 110 are connected to each other in series, thus, while the number of the luminous bodies 110 is not changed, the magnitude of current can be reduced, and meanwhile, the number of carried lights can be increased. Moreover, the various luminous bodies 110 are subjected to normal surface mounting, series connection of the luminous bodies 110 with signal input and output is facilitated, production is facilitated, and the cost is low.

Referring to FIG. 1, the embodiment also provides a curtain structure 10, which includes the plurality of high-voltage point-controlled cascaded LED strip lights 100, and the plurality of high-voltage point-controlled cascaded LED strip lights 100 are connected to one another.

Further, the curtain structure 10 further includes a grounding main line 211 (GND line) and a power supply main line 212 (VDD line). One ends of the plurality of high-voltage point-controlled cascaded LED strip lights 100 are electrically connected to the grounding main line 211, and the other ends of the plurality of high-voltage point-controlled cascaded LED strip lights are electrically connected to the power supply main line 212, so that the plurality of high-voltage point-controlled cascaded LED strip lights 100 are connected in parallel. Specifically, one of the high-voltage point-controlled cascaded LED strip lights 100 is taken as an example, the high-voltage point-controlled cascaded LED strip light 100 is provided with a head end and a tail end, the first electric wire 131 located at the head end of the high-voltage point-controlled cascaded LED strip light 100 is electrically connected to the grounding main line 211, and the second electric wire 132 located at the tail end of the high-voltage point-controlled cascaded LED strip light 100 is electrically connected to the power supply main line 212.

Further, the signal lines 133 of the plurality of high-voltage point-controlled cascaded LED strip lights 100 are successively connected, in other words, the various luminous bodies 110 in the plurality of high-voltage point-controlled cascaded LED strip lights 100 can be regarded as being connected in series to the same signal line 133. The curtain structure 10 further includes a controller 213, and the signal line 133 is electrically connected to the controller 213. Further, a resistor 214 is further arranged between the signal line 133 and the controller 213. Meanwhile, the controller 213 is electrically connected to the grounding main line 211.

It should be noted that, in the curtain structure 10 as shown in FIG. 1, the plurality of high-voltage point-controlled cascaded LED strip lights 100 are connected to one another in parallel, and it can be understood that in other embodiments, the plurality of high-voltage point-controlled cascaded LED strip lights 100 can be connected to one another in series as needed.

Figure 5:
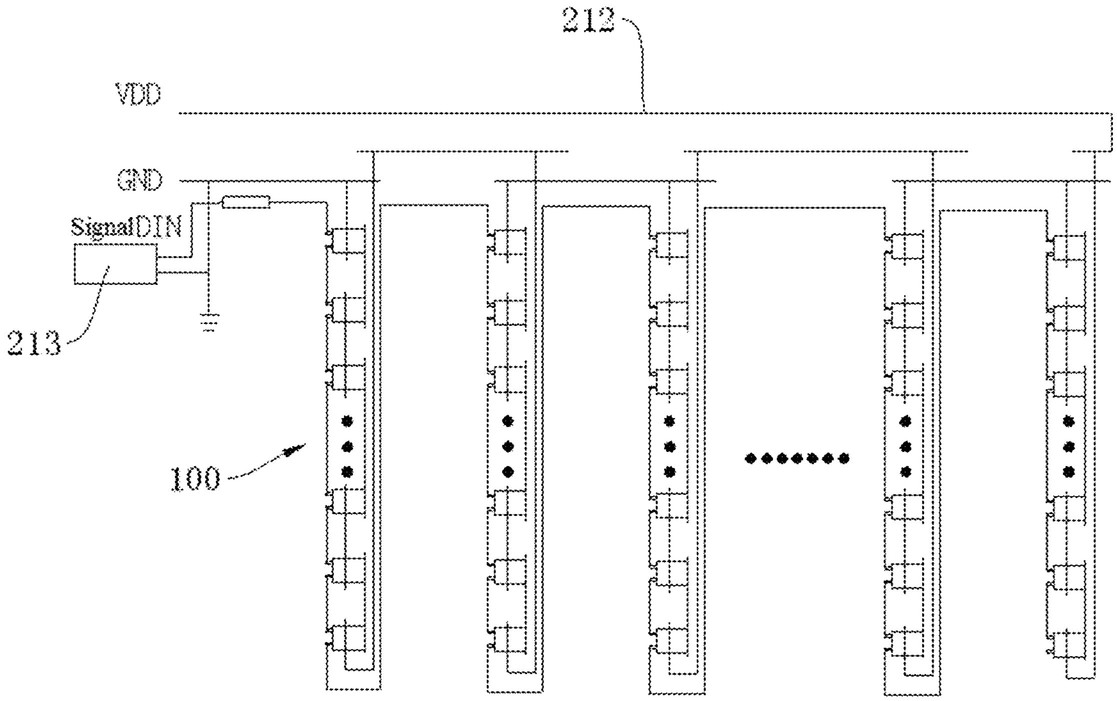
FIG. 5 is a structural diagram of another curtain structure according to an embodiment of the present disclosure.

Exemplarily, FIG. 5 illustrates a structure of another curtain structure 10 of the embodiment. Referring to FIG. 5, in the embodiment, the plurality of high-voltage point-controlled cascaded LED strip lights 100 in the curtain structure 10 are connected to one another in series.

Figure 6A:
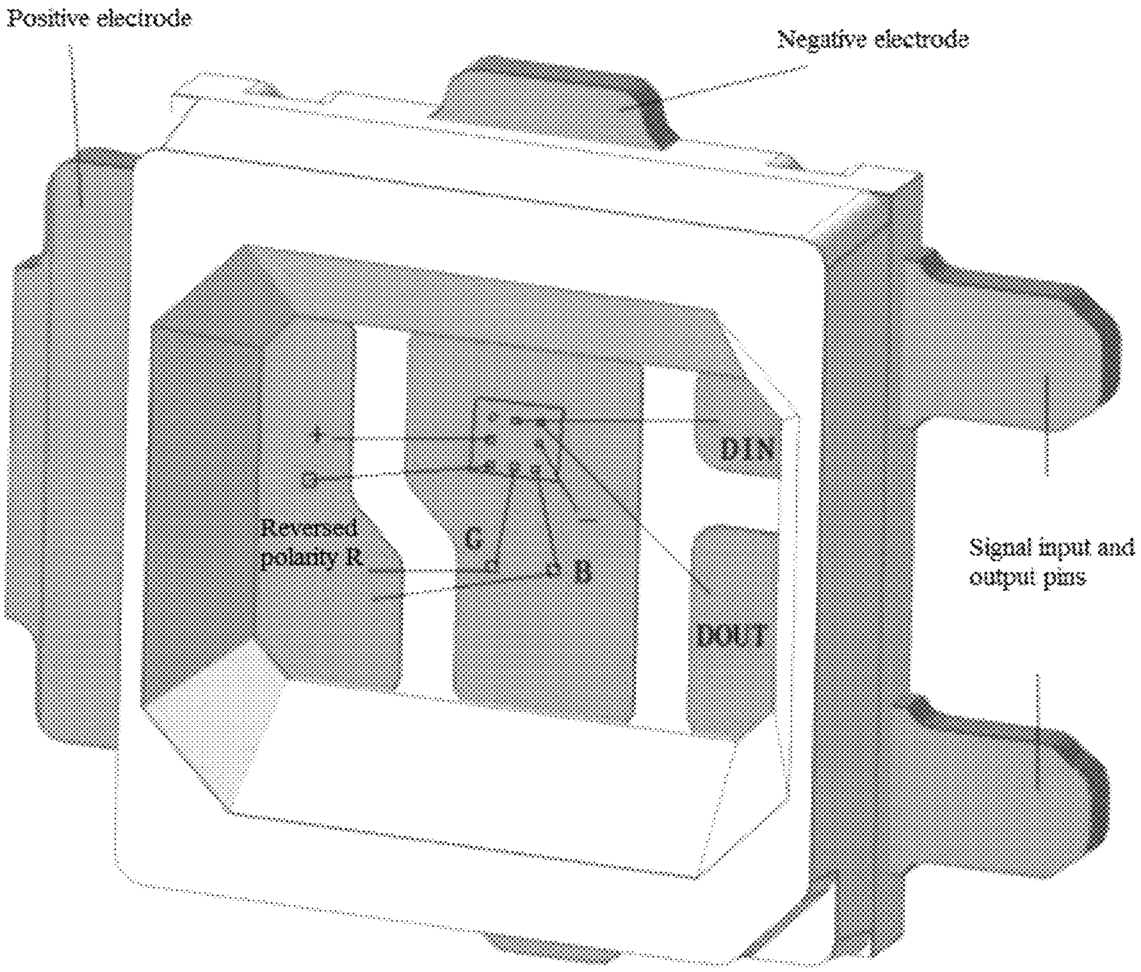
FIG. 6A and FIG. 6B illustrate a first LED luminous body and a second LED luminous body with positive electrodes and negative electrodes arranged in an opposite manner according to an embodiment of the present disclosure.
Figure 6B:
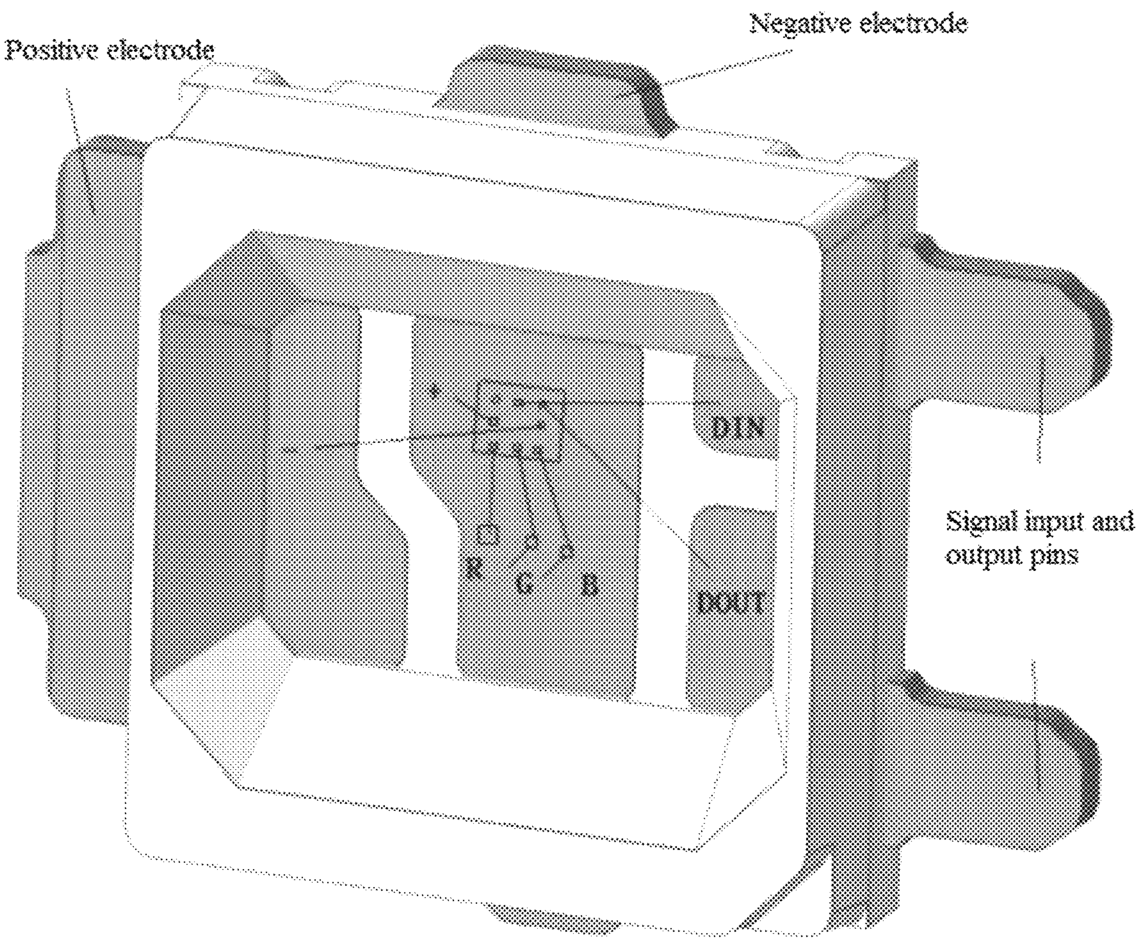

In another embodiment, as shown in FIG. 6A and FIG. 6B, the first LED luminous body and the second LED luminous body are illustrated, in which the positive electrodes and the negative electrodes are arranged in an opposite manner, wherein the positive electrode in FIG. 6A has a structure and size equivalent to those of the negative electrode in FIG. 6B, and the negative electrode in FIG. 6A has a structure and size equivalent to those of the positive electrode in FIG. 6B. It should be noted that signal input and output pins are located on the same side, and for the 2 pins, the upper pin is exemplified by a DIN pin, and the lower pin is exemplified by a DOUT pin. Obviously, the first LED luminous body and the second LED luminous body in FIG. 6A and FIG. 6B are used for facilitating series connection in the LED strip light, and the first type of pins, the second type of pins and the third type of pins are respectively positioned on different sides. It can be understood that the first, second and third types of pins may be arranged in other forms as long as the signal input and output pins are on the same side of the plurality of LED luminous bodies and are beneficial to the series-parallel connection of the plurality of LED luminous bodies.

The rack body of the LED luminous body is square (note: the square rack body can be a rectangular rack body or a quadrate rack body), and the rack body includes a first plate-shaped edge, a second plate-shaped edge, a third plate-shaped edge and a fourth plate-shaped edge which are connected end to end;

- an end of the first substrate extends out of the rack body from a direction perpendicular to the first plate-shaped edge;
- two ends of the second substrate respectively extend out of the rack body from two opposite directions perpendicular to the second plate-shaped edge and the fourth plate-shaped edge; and
- an end of the third substrate extends out of the rack body from a direction perpendicular to the third plate-shaped edge.

The first type of pins are signal input and output pins in FIG. 6A and FIG. 6B;

- the second type of pins are a negative electrode in FIG. 6A and a positive electrode in FIG. 6B;
- the third type of pins are a positive electrode in FIG. 6A and a negative electrode in FIG. 6B; and
- in addition, LED chips, namely R, G and B chips (wherein, in FIG. 6A, R is reversed polarity; and it can be understood that R may not be reversed polarity), and positive and negative pin joints, DIN pin joints and DOUT pin joints are arranged on the second substrate in the center of the luminous body, and the pin joints respectively electrically communicate with the three types of pins in a wiring manner.

Figure 7A:
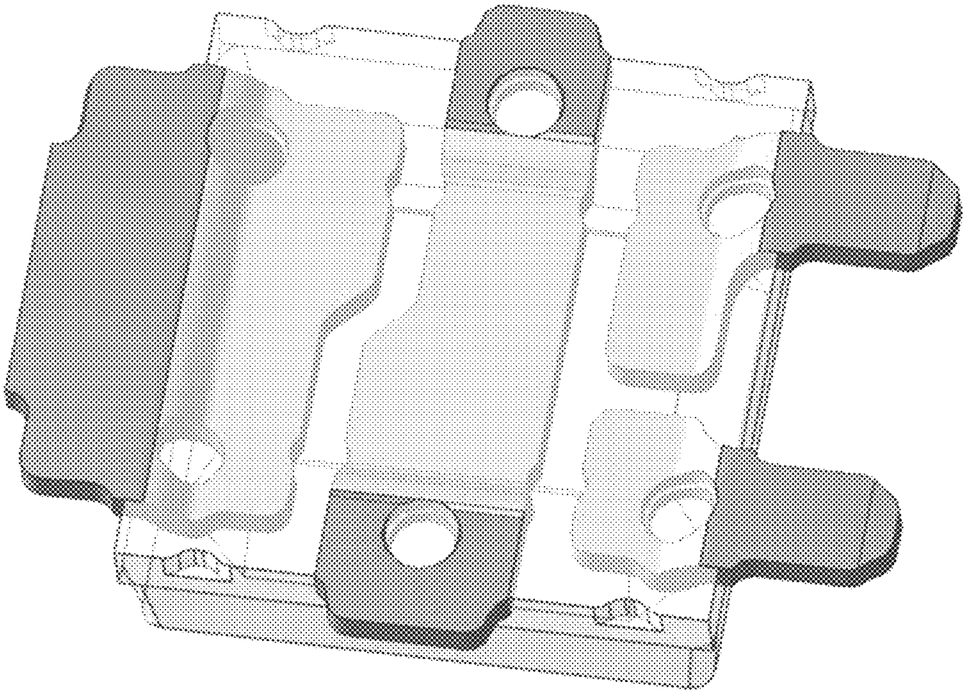
FIG. 7A and FIG. 7B are structural perspective views of the first LED luminous body and the second LED luminous body according to an embodiment of the present disclosure.
Figure 7B:
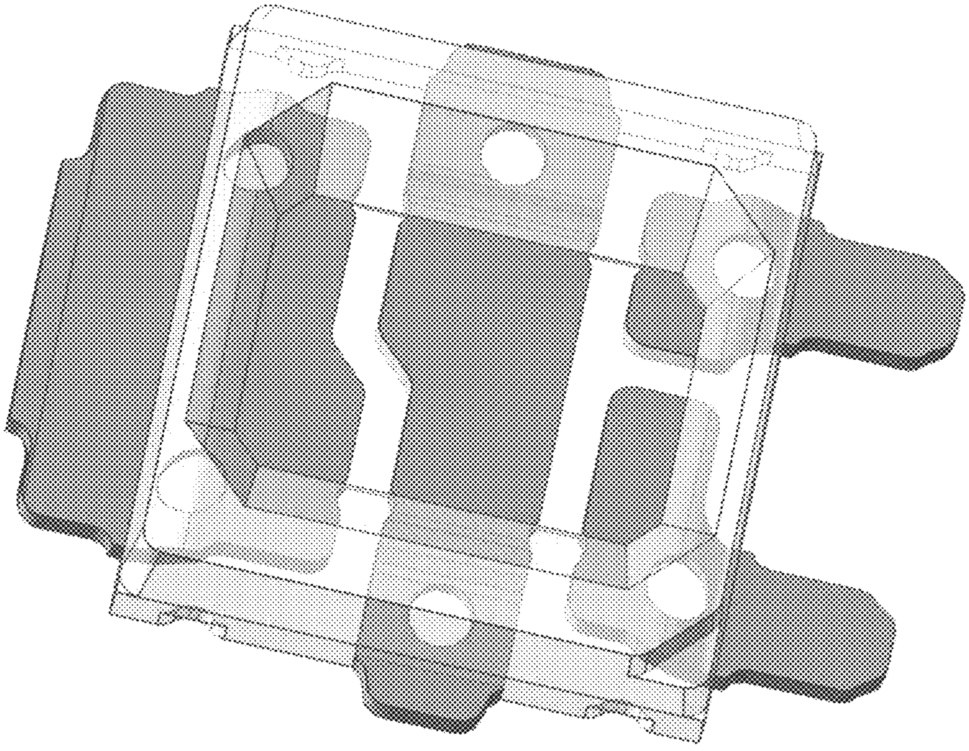

In another embodiment, as shown in FIG. 7A and FIG. 7B, the structures of the first and second LED luminous bodies are illustrated by way of perspective views. Two ends of the second type of pins and two ends of the third type of pins respectively include corresponding holes. Because the first type of pins are signal input and output pins, the first type of pins include DIN and DOUT pins which are independent of each other, and each pin includes a corresponding hole.

It should be noted that the strip light of the present disclosure merely means that the strip light can be arranged in a strip shape when being installed or used, but the strip shape includes not only a one-piece strip, such as a strip plate, but also a relatively split strip, such as a loose strip, a band, a string, a rope and a filament, and the strip of the present disclosure is not limited thereto.

The above description is only for the specific embodiments of the present disclosure, but the scope of protection of the present disclosure is not limited thereto, and any changes or substitutions that can be easily conceived by those skilled in the art within the technical scope of the present disclosure are also within the scope of protection of the present disclosure. Therefore, the scope of protection of the present disclosure shall be subject to the scope of protection of the claims.

What is claimed is:

1. An LED strip light, comprising:

a first signal line, a second power supply wire and a third power supply wire along a first direction as well as a first LED luminous body and a second LED luminous body along a second direction, and the first LED luminous body being electrically connected to the second LED luminous body;

the first LED luminous body further comprising a first type of pins and a second type of pins arranged along the first direction as well as a third type of pins;

the first type of pins, the second type of pins and the third type of pins being respectively used for being connected to the first signal line, the second power supply wire and the third power supply wire;

the first type of pins of the first LED luminous body and the first type of pins of the second LED luminous body being in a roughly aligned spatial location relationship along the second direction;

moreover, the strip light having any one of the following characteristics that:

(1) along the first LED luminous body and the second direction, the strip light further comprises a second LED luminous body, when the first LED luminous body and the second LED luminous body are connected in series, the second type of pins of the first LED luminous body and the third type of pins of the second LED luminous body are in a roughly aligned spatial location relationship along the second direction; and the third type of pins of the first LED luminous body and the second type of pins of the second LED luminous body are in a roughly aligned spatial location relationship along the second direction;

(2) along the first LED luminous body and the second direction, the strip light further comprises a second LED luminous body, and when the first LED luminous body and the second LED luminous body are connected in parallel, the second type of pins of the first LED luminous body and the second type of pins of the second LED luminous body are in a roughly aligned spatial location relationship along the second direction;

the third type of pins of the first LED luminous body and the third type of pins of the second LED luminous body are in a roughly aligned spatial location relationship along the second direction;

the rack body of the LED luminous body is square, and comprises a first plate-shaped edge, a second plate-shaped edge, a third plate-shaped edge and a fourth plate-shaped edge which are connected end to end;

an end of the first substrate extends out of the rack body from a direction perpendicular to the first plate-shaped edge;

two ends of the second substrate respectively extend out of the rack body from two opposite directions perpendicular to the second plate-shaped edge and the fourth plate-shaped edge; and an end of the third substrate extends out of the rack body from a direction perpendicular to the third plate-shaped edge.

2. The strip light according to claim 1, wherein the first LED luminous body comprises a rack body as well as a first substrate, a second substrate and a third substrate which are connected to the rack body and are spaced from one another; and the first type of pins, the second type of pins and the third type of pins respectively extend out of the periphery of the rack body from the first substrate, the second substrate and the third substrate.

3. The strip light according to claim 1, wherein a plane in the extending-out direction of the first type of pins and a plane in the extending-out direction of the second or third type of pins are parallel, or are the same.

4. The strip light according to claim 1, wherein the LED strip light has the ability of expanding other LED luminous bodies with the structures the same as the structure of the first LED luminous body in a cascading manner, and the third direction is parallel to the second direction.

5. The strip light according to claim 1, wherein the first LED luminous body comprises a built-in driving IC and LED chips used as pixel points to emit light, so that the strip light is a point-controlled LED light.

6. The strip light according to claim 1, wherein the first type of pins comprises a first connecting portion and a second connecting portion which extend out from the first substrate and are spaced from each other, and a space is formed between the first connecting portion and the second connecting portion and used as a trimming opening, and the second connecting portion of the first LED luminous body and the first connecting portion of the second luminous body are electrically connected.

7. The strip light according to claim 1, wherein the first connecting portion and the second connecting portion are distributed along the second direction, wherein the first connecting portion is located at one end which is relatively close to the first signal line in the second direction, and the second connecting portion is located at the other end which is relatively away from the first signal line in the second direction.

8. The strip light according to claim 1, wherein along the first LED luminous body and the second direction, the strip light further comprises a second LED luminous body, and when the first LED luminous body and the second LED luminous body are connected in series:

the first LED luminous body and the second LED luminous body form a first LED luminous body pair, and the strip light totally comprises k LED luminous body pairs, the value range of k is 1 to n, and n is a positive integer;

wherein with regard to the kth LED luminous body pair and the (k+1) th LED luminous body pair, the third type of pins of the second LED luminous body in the kth LED luminous body pair and the third type of pins of the first LED luminous body in the kth LED luminous body pair are electrically connected; and the second type of pins of the second LED luminous body in the kth LED luminous body pair and the second type of pins of the first LED luminous body in the (k+1) th LED luminous body pair are electrically connected.

9. The strip light according to claim 1, wherein when other LED luminous bodies are expanded in a cascading manner along the third direction in the LED strip light, the other LED luminous bodies and the whole first LED luminous body along the second direction may be in a parallel connection relationship, and may also be in a series connection relationship.

* * * * *